United States Patent
Schwartz et al.

(10) Patent No.: US 9,558,400 B2
(45) Date of Patent: Jan. 31, 2017

(54) SEARCH BY STROKE

(71) Applicants: Edward L. Schwartz, Menlo Park, CA (US); John W. Barrus, Menlo Park, CA (US)

(72) Inventors: Edward L. Schwartz, Menlo Park, CA (US); John W. Barrus, Menlo Park, CA (US)

(73) Assignee: Ricoh Company, Ltd., Tokyo (JP)

( * ) Notice: Subject to any disclaimer, the term of this patent is extended or adjusted under 35 U.S.C. 154(b) by 521 days.

(21) Appl. No.: 13/789,583

(22) Filed: Mar. 7, 2013

(65) Prior Publication Data

US 2014/0254941 A1    Sep. 11, 2014

(51) Int. Cl.
G06K 9/46      (2006.01)
G06K 9/00      (2006.01)
G06F 17/30     (2006.01)
G06K 9/62      (2006.01)

(52) U.S. Cl.
CPC ..... G06K 9/00436 (2013.01); G06F 17/30011 (2013.01); G06K 9/00442 (2013.01); G06K 9/6218 (2013.01)

(58) Field of Classification Search
None
See application file for complete search history.

(56) References Cited

U.S. PATENT DOCUMENTS

| | | | | |
|---|---|---|---|---|
| 5,832,474 A | * | 11/1998 | Lopresti | G06F 17/30011 |
| 6,565,611 B1 | * | 5/2003 | Wilcox | G06F 17/242 382/224 |
| 8,094,939 B2 | | 1/2012 | Zhang | |
| 8,219,908 B2 | | 7/2012 | Napper | |
| 2002/0165873 A1 | * | 11/2002 | Kwok | G06K 9/00872 715/268 |
| 2005/0154707 A1 | * | 7/2005 | Napper | G06F 17/30011 |
| 2007/0168382 A1 | * | 7/2007 | Tillberg | G06F 17/30253 |
| 2014/0118242 A1 | * | 5/2014 | Akashi | G06F 3/04883 345/156 |

OTHER PUBLICATIONS

Rath, Toni M., and Raghavan Manmatha. "Word image matching using dynamic time warping." Computer Vision and Pattern Recognition, 2003. Proceedings. 2003 IEEE Computer Society Conference on. vol. 2. IEEE, 2003. 9 pages.*

Aref, Walid, Daniel Barbará, and Padmavathi Vallabhaneni. "The handwritten trie: Indexing electronic ink." ACM SIGMOD Record. vol. 24. No. 2. ACM, 1995. 12 pages.*

(Continued)

*Primary Examiner* — Sumati Lefkowitz
*Assistant Examiner* — Ryan P Potts
(74) *Attorney, Agent, or Firm* — Patent Law Works

(57) ABSTRACT

An electronic writing solution server includes a query engine and a user interface engine. The query engine receives a search query from a user, the search query specifying a field in at least one form and including a first stroke or text, retrieves clusters from a database, retrieves example strokes from the clusters at vary levels of similarity to the first stroke, receives user selections for strokes of interest from the example strokes, and retrieves information associated with the strokes of interest from the database. The user interface engine generates graphical data for presenting the retrieved information to the user.

20 Claims, 12 Drawing Sheets

(56) References Cited

OTHER PUBLICATIONS

Lopresti, Daniel, and Andrew Tomkins. "On the searchability of electronic ink." Proceedings of the 4th International Workshop on Frontiers in Handwriting Recognition. 1994. 13 pages.*

Vuurpijl, Louis, and Lambert Schomaker. "Finding structure in diversity: A hierarchical clustering method for the categorization of allographs in handwriting." Document Analysis and Recognition, 1997., Proceedings of the Fourth International Conference on. vol. 1. IEEE, 1997. 7 pages.*

Sargur N Srihari and Zhixin Shi, Forensic Handwritten Document Retrieval System, dated 2004, 7 pages.

Qiao, Wang, and Xu, Learning Mahalanobis Distance for DTW based Online Signature Verfication, dated Jun. 2011, 6 pages, IEEE International Conference on Information and Automation Shenzhen, China.

* cited by examiner

SEARCH BY STROKE

BACKGROUND OF THE INVENTION

1. Field of the Invention

The specification relates to information search. In particular, the specification relates to searching for matching strokes based on clusters created for strokes in a set of forms.

2. Description of the Background Art

As the use of portable computing devices becomes common, many users input information into a form by using a stylus or a fingertip on the portable computing devices. For example, a user can fill out a medical form on a table. When searching the stroke data in the form, one approach is to convert the stroke data to symbolic text and perform a search using the symbolic text. However, the conversion can be error prone and if the results were similarly converted from stroke data, the results are subject to an error prone conversion as well. Another approach is to collect multiple stroke samples from the user (e.g., ask for the user to write the same word multiple times on multiple devices), analyze the multiple stroke samples and perform a search based on the analysis. The matching data from this approach create too many irrelevant results, and therefore have limited usefulness.

SUMMARY OF THE INVENTION

The disclosure overcomes the deficiencies of the prior art with a system for searching a stroke based on clusters created for strokes in a set of forms. In one embodiment, an electronic writing solution server includes a search by stroke application comprising a query engine and a user interface engine. The query engine receives a search query from a user, the search query specifying a field in at least one form and including a first stroke or text, retrieves clusters from a database, retrieves example strokes from the clusters at varying levels of similarity to the first stroke, receives user selections for strokes of interest from the example strokes, and retrieves information associated with the strokes of interest from the database. The user interface engine generates graphical data for presenting the retrieved information to the user. The communication unit provides the retrieved information to the user.

Other aspects include corresponding methods, systems, apparatuses, and computer program products for these and other innovative aspects.

The system advantageously creates clusters based on strokes in a field of a set of forms and searches a stroke based on the clusters. The system augments the search of a stroke by grouping strokes based on similarity. The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
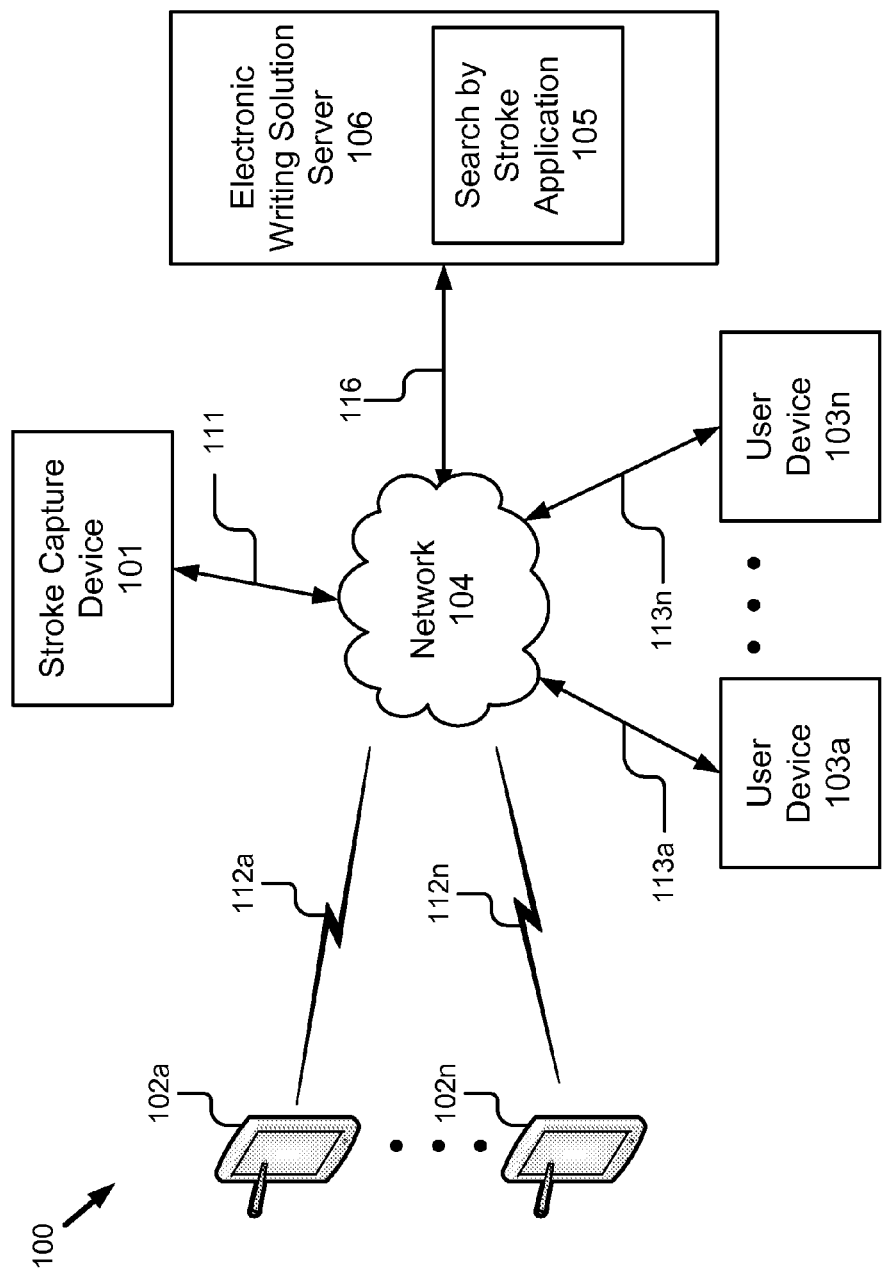
FIG. 1 is a high-level block diagram illustrating one embodiment of a system for searching a stroke based on clusters created for strokes in a set of forms.

A description of a system and method for searching by stroke based on clusters created for strokes in a set of forms follows. For purposes of explanation, numerous specific details are set forth in order to provide a thorough understanding of the invention. It will be apparent, however, to one skilled in the art that the embodiments can be practiced without these specific details. In other instances, structures and devices are shown in block diagram form in order to avoid obscuring the invention. For example, the invention is described in one embodiment below with reference to user devices such as a smart phone and particular software and hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this invention, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a block diagram of a system 100 for searching strokes based on clusters created for strokes in a set of forms according to one embodiment. The term "strokes" will be understood to mean a single stroke (e.g. a checkmark) or a group of strokes (e.g. a word). The system 100 includes a stroke capture device 101, portable computing devices 102a-102n, user devices 103a-103n and an electronic writing solution server 106 that are each communicatively coupled to the network 104. In FIG. 1 and the remaining figures, a letter after a reference number, such as "102a" is a reference to the element having that particular reference number. A reference number in the text without a following letter, such as "102," is a general reference to any or all instances of the element bearing that reference number.

The network 104 is a conventional type, wired or wireless, and may have any number of configurations such as a star configuration, token ring configuration or other configurations known to those skilled in the art. Furthermore, the network 104 may comprise a local area network (LAN), a wide area network (WAN) (e.g., the Internet), and/or any other interconnected data path across which multiple devices may communicate. In yet another embodiment, the network 104 may be a peer-to-peer network. The network 104 may also be coupled to or includes portions of a telecommunications network for sending data in a variety of different communication protocols. In yet another embodiment, the network 104 includes Bluetooth communication networks or a cellular communications network for sending and receiving data such as via short messaging service (SMS), multimedia messaging service (MMS), hypertext transfer protocol (HTTP), direct data connection, wireless application protocol (WAP), email, etc. While only one network 104 is coupled to the plurality of user devices 103a-103n, the plurality of portable computing devices 102a-102n and the electronic writing solution server 106, in practice any number of networks 104 can be connected to the entities.

The portable computing devices 102a-102n are each wirelessly coupled to the network 104 via signal lines 112a-112n respectively. The portable computing device 102 is any computing device including a memory, a processor and wireless communication capability. For example, the portable computing device 102 can be a tablet computer, a personal digital assistant, a smart phone, etc. The portable computing device 102 is adapted to receive form images, add stroke annotation to the form images and send the annotated form images to the electronic writing solution server 106. A form is an electronic document that includes fields (e.g., blank spaces) for insertion of requested information. The form when filled out with the requested information may be a statement, an order, a request, etc. For example, a form can be a tax form, an insurance form, a medical form, an electronic check, a job application, a survey, a receipt, etc.

In one embodiment, the portable computing device 102 is a tablet computer including a computing pad and a stylus. The computing pad is adapted to display a form image that includes strokes. The strokes are written on the form image using a stylus or a fingertip by a user. The strokes are typically displayed on top of the image, just as if written by pen on paper. The computing pad usually receives the strokes as a sequence of points or segments along with a location, timing and pressure information. The computing pad sends the form images in any image format known to persons of ordinary skill in the art, for example, a Scalable Vector Graphics (SVG) file format, which can contain both strokes and images. In one embodiment, the computing pad attaches the information associated with the strokes, for example, the location and timing information with the form images as metadata. The portable computing device 102 determines location information by using global positioning system (GPS) circuitry or accessing a database including media access control (MAC) addresses. In one embodiment, the strokes are saved in a format known to any person of ordinary skill in the art, including SVG or Ink Markup Language (InkML).

The stroke capture device 101 is coupled to the network 104 via signal line 111. The stroke capture device 101 is adapted to capture a form that includes strokes, identify strokes in the form and send the strokes associated with the form to the electronic writing solution server 106. For example, the stroke capture device 101 is a camera, a printer, a scanner that captures the image of a printed form. The strokes are provided when a user filled out a form using a stylus, a fingertip, a pen, etc. The stroke capture device 101 identifies the strokes associated with a set of fields in the form, and sends the form and stroke information to the electronic writing solution server 106.

The user devices 103a-103n are each coupled to the network 104 via the signal lines 113a-113n respectively. The user device 103 is any computing device that includes a memory and a processor, for example, a desktop computer, a laptop computer, etc. The user device 103 is adapted to send and receive data to and from the electronic writing solution server 106. For example, the user device 103 sends a request to the electronic writing solution server 106 to search a stroke and receives a form that includes the stroke from the electronic writing solution server 106. The user device 103 is accessed by users that have permission to access information from the electronic writing solution server 106, such as a creator of the form sent to portable computing devices 102 or an administrator of the electronic writing solution server 106.

The electronic writing solution server 106 is any computing device including a memory and a processor and is coupled to the network 104 via signal line 116. The electronic writing solution server 106 includes a search by stroke application 105. The search by stroke application 105 receives a set of forms including strokes from the portable computing devices 102a-102n and the stroke capture device 101, creates clusters based on the strokes included in a field of the set of forms and responds to a user's query that contains a stroke based on the clusters. The search by stroke application 105 is described in further detail below with reference to FIG. 2.

Electronic Writing Solution Server 106

Figure 2:
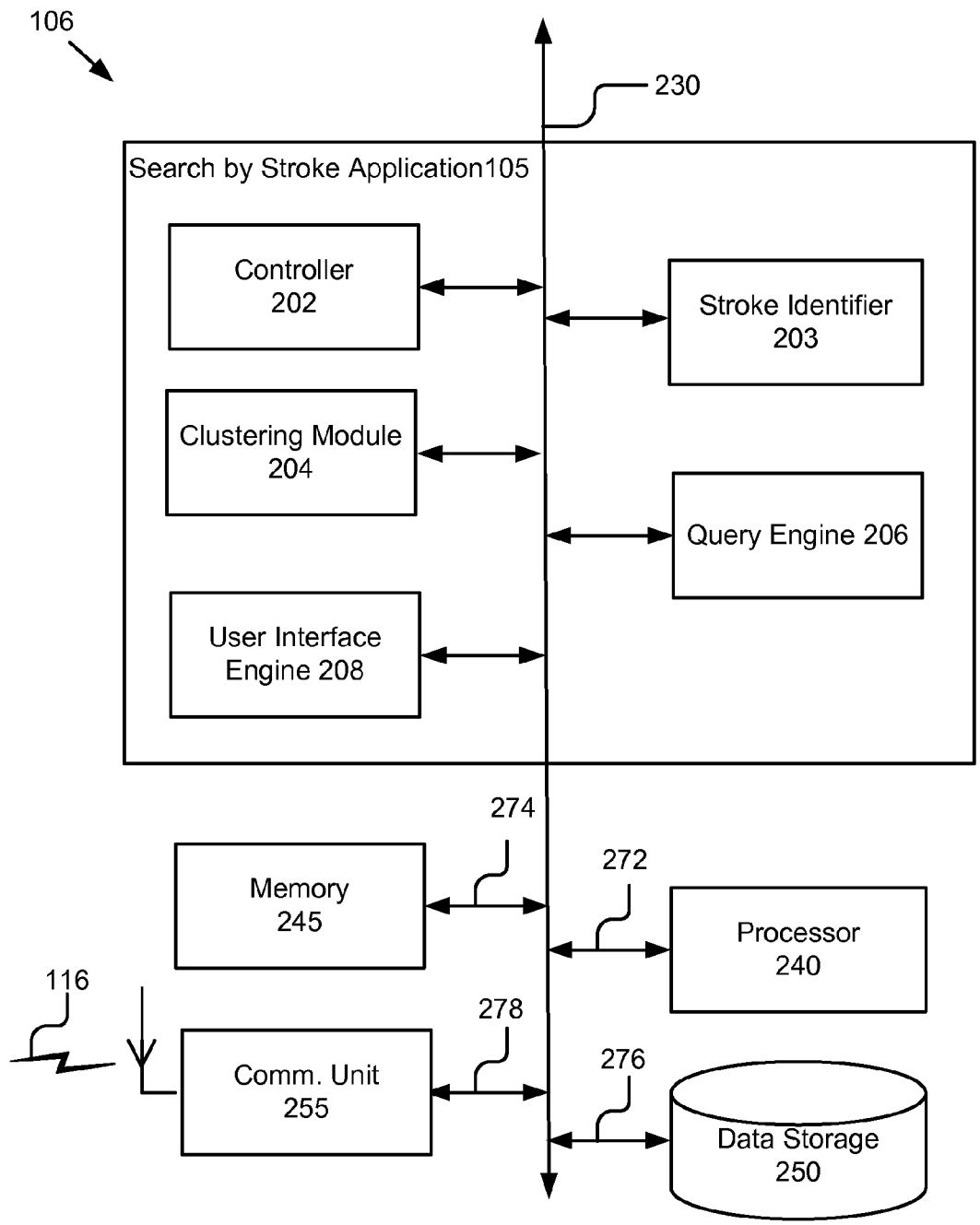
FIG. 2 is a block diagram illustrating one embodiment of a search by stroke application in more detail.

Referring now to FIG. 2, the search by stroke application 105 is shown in more detail. FIG. 2 is a block diagram of the electronic writing solution server 106 that includes a processor 240, a memory 245, a communication unit 255, data storage 250 and the search by stroke module 105.

The processor 240, the memory 245, the communication unit 255 and the data storage 250 are communicatively coupled to the bus 230. The bus 230 may represent one or more buses including an industry standard architecture (ISA) bus, a peripheral component interconnect (PCI) bus, a universal serial bus (USB), or some other bus known in the art to provide similar functionality.

The processor 240 comprises an arithmetic logic unit, a microprocessor, a general purpose controller or some other processor array to perform computations. The processor 240 is coupled to the bus 230 for communication with the other components via signal line 272. Processor 240 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 245 stores instructions and/or data that may be executed by processor 240. The memory 245 is coupled to the bus 230 for communication with the other components via signal line 274. The instructions and/or data may comprise code for performing any and/or all of the techniques described herein. The memory 245 may be a dynamic random access memory (DRAM) device, a static random access memory (SRAM) device, flash memory or some other memory device known in the art. In one embodiment, the memory 245 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The communication unit 255 is hardware for receiving and transmitting data by linking the processor 240 to the network 104 and other processing systems. The communication unit 255 receives data such as requests from the user device 103 and transmits the requests to the query engine 206, for example a query for browsing clusters. The communication unit 255 also receives information, such as forms, from the portable computing device 102. The communication unit 255 transmits data to the user device 103, for example, a query result in response to handing a search query. The communication unit 255 is coupled to the bus 230 via signal line 278.

In one embodiment, the communication unit 255 includes a port for direct physical connection to the user device 103, the portable computing device 102 or to another communication channel. For example, the communication unit 255 includes an RJ45 port or similar port for wired communication with the user device 103. In another embodiment, the communication unit 255 includes a wireless transceiver 116 for exchanging data with the user device 103, the portable computing device 102 or any other communication channel using one or more wireless communication methods, such as IEEE 802.11, IEEE 802.16, Bluetooth® or another suitable wireless communication method.

In yet another embodiment, the communication unit 255 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 255 includes a wired port and a wireless transceiver. The communication unit 255 also provides other conventional connections to the network 104 for distribution of files and/or media objects using standard network protocols such as TCP/IP, HTTP, HTTPS and SMTP as will be understood to those skilled in the art.

The data storage 250 is a non-transitory memory that stores instructions and/or data used for searching a stroke based on clusters created for strokes in a set of forms. For example, the data storage 250 stores a set of forms, clusters created based on the set of forms, example strokes associated with the clusters and queries related to the clusters. The data storage 250 is coupled to the bus 230 for communication with the other components via signal line 276.

In one embodiment, the search by stroke application 105 includes a controller 202, a stroke identifier 203, a clustering module 204, a query engine 206 and a user interface engine 208.

The controller 202 is software and routines for receiving data via the communication unit 255, routing the data to the appropriate engine or module and transmitting responses from modules or engines to the communication unit 255 for transmitting to the user device 103 and other components of the system 100. In one embodiment, the controller 202 is a set of instructions executable by the processor 240 to provide the functionality described below for managing data transfer between the components of the electronic writing solution server 106 and other components of the system 100. In another embodiment, the controller 202 is stored in the memory 245 and is accessible and executable by the processor 240. In either embodiment, the controller 202 is adapted for cooperation and communication with the processor 240, the communication unit 255 and other components of the electronic writing solution server 106.

The stroke identifier 203 is software and routines for receiving stroke data associated with a form and identifying the position of the stroke data. In one embodiment, the stroke identifier is a set of instructions executable by the processor 240 to provide the functionality described below for receiving stroke data from the portable computing devices 102 or the stroke capture device 101 via the controller. In another embodiment, the stroke identifier 203 is stored in the memory 245 and is accessible and executable by the processor 240. In either embodiment, the stroke identifier 203 is adapted for cooperation and communication with the processor 240, the communication unit 255 and other components of the electronic writing solution server 106.

In one embodiment, the stroke identifier 203 identifies a stroke in a form image by identifying pixels in the form image that represent handwriting strokes. For example, the stroke identifier 203 identifies stroke pixels based on pixel intensities, pixel colors, etc. The stroke identifier 203 then determines a position (e.g., an x-y coordinate) of a stroke in the form. For example, the stroke identifier 203 uses metadata along with a form image to determine the position of each stroke in the form image. The stroke identifier 203 associates a stroke with a field in the form based on the position of the stroke. For example, the stroke identifier 203 identifies a field in a position of the form with a field identifier. Once a stroke in the position is identified, the stroke identifier 203 associates the stroke with the field using the field identifier.

In one embodiment, the stroke identifier 203 receives the completed form data including strokes (e.g. in InkML or other vector format) from the controller 202. The received form data also includes an unmarked blank form image (i.e., an image of the form without any strokes) as metadata. In another embodiment, the stroke identifier 203 generates completed form data for each completed form from an input completed form image by, for example, subtracting the input completed form image with the unmarked blank form image. The stroke identifier 203 then identifies the position of each stroke within the completed form data and compares it to the known location of the fields in the form.

Within this specification, stroke data is captured from forms as a sequence of points, line segments or curves, optionally including pressure, time and acceleration information associated with the strokes. For convenience, the strokes are frequently converted to images, but the images can include metadata about the strokes, like pressure or time data. The metadata could be included within the image or associated with the image in other ways. Stroke data and image data are frequently used interchangeably to refer to the data captured as strokes on the portable computing device 102.

The clustering module 204 is software and routines for creating clusters of strokes based on a set of forms. In one embodiment, the clustering module 204 is a set of instructions executable by the processor 240 to provide the functionality described below for creating clusters based on a set of forms. In another embodiment, the clustering module 204 is stored in the memory 245 and is accessible and executable by the processor 240. In either embodiment, the clustering module 204 is adapted for cooperation and communication with the processor 240, the communication unit 255 and other components of the electronic writing solution server 106.

In one embodiment, the clustering module 204 receives a set of forms including strokes from portable computing devices 102a-102n and the stroke capture device 101 via the controller 202, identifies a field in the set of forms and strokes included in the field, and creates clusters based on similarities between the strokes included in the field.

The clustering module 204 receives a set of forms that includes strokes in one or more fields. The strokes can be digital handwriting data, a single stroke or groups of strokes that represent a number, a character, a word, an ad hoc symbol, short-hand, etc. For example, the clustering module 204 receives a visitor registration form filled out by Mike. The form includes fields for a date, a visitor name, a company name, a person the visitor is seeing, an email address and a signature. The clustering module 204 receives the form that includes Mike's handwriting in these fields. In one embodiment, the set of forms includes the same type of forms filled out by different users. For example, the set of forms includes 100 visitor registration forms filled out by 100 users. In another embodiment, the set of forms includes different types of forms that include one or more common fields. The common fields include strokes from different users. For example, the set of forms includes two types of forms: visitor registration forms and employee questionnaire forms. Both types of forms include a name field and a signature field. The clustering module 204 receives users' handwriting in both the name field and the signature field.

The clustering module 204 identifies a field in the set of forms that includes strokes. In one embodiment, the clustering module 204 receives the set of forms and stroke information from the stroke capture device 101 via the controller 202, and identifies a field in the set of forms that includes strokes. For example, the clustering module 204 determines that the first field, the third field and the fourth field in the set of forms include strokes and selects the third field from the three fields that includes strokes for further processing. In one embodiment, the clustering module 204 receives the set of forms that includes more than one type of forms, determines common fields in the more than one type of forms and selects a field from the common fields. The clustering module 204 identifies the strokes included in the field.

Once a field and the strokes included in the field are identified, the clustering module 204 determines similarities between the strokes included in the field, creates clusters based on the similarities and represents each cluster with at least one example stroke. In one embodiment, the clustering module 204 stores the clusters and associated example strokes in a database. In one embodiment, the database is the data storage 250.

The clustering module 204 determines distance metrics between the strokes included in a field to measure similarities between the strokes. In one embodiment, the clustering module 204 performs feature extraction on the strokes in a field and determines a feature distance between pairs of strokes. For example, the clustering module 204 performs feature extraction on geometric coordinates and timing information of strokes, and computes a feature distance using a dynamic time warping (DTW) algorithm. Persons with ordinary skill in the art will recognize that other methods can be used to determine similarities between strokes. The clustering module 204 classifies similar strokes into a cluster based on the distance metrics. For example, the clustering module 204 identifies a ranking field in a set of forms for performing clustering. The clustering module 204 determines that a number "four" written by Alice and a number "four" written by John in the ranking field are similar and thereby creates a first cluster to include the handwritten fours from Alice and John. The clustering module 204 also determines that the number "four" written by Mary and the number "four" written by Robert in the ranking field are similar and thereby creates a second cluster to include the handwritten fours from Mary and Robert. The clustering module 204 selects at least one example stroke from the strokes included in a cluster and uses the at least one example stroke to represent the cluster. Continuing with the above example, the clustering module 204 uses Alice's handwritten "four" as an example stroke to represent the first cluster and uses Robert's handwritten "four" to represent the second cluster.

Figure 3A:
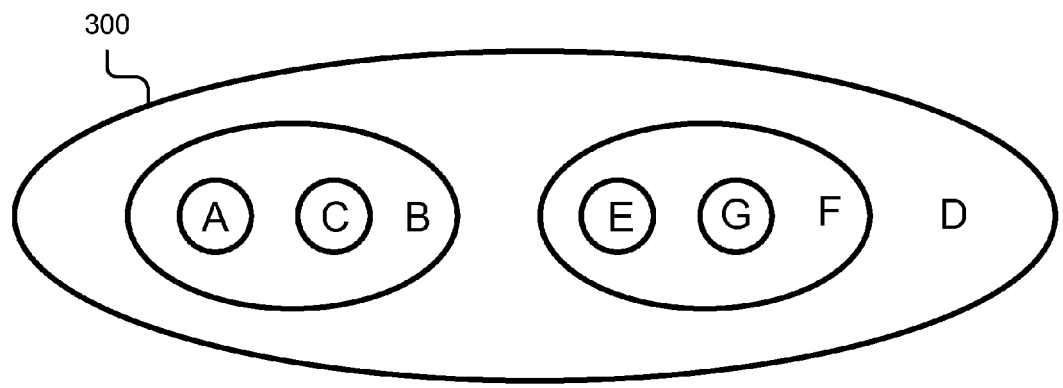
FIG. 3A is a graphic representation of an example Venn diagram of a hierarchical cluster.

The clustering module 204 creates a hierarchical cluster that includes at least one level of cluster. In one embodiment, the hierarchical cluster is represented by a compact structure with a first cluster level (e.g., a parent cluster) nesting other cluster levels (e.g., a child cluster). FIG. 3A is an example structure of a hierarchical cluster. The hierarchical cluster 300 includes seven clusters (e.g., clusters A-G) with three levels. The first cluster level is labeled cluster D. Cluster D includes two clusters in the second cluster level labeled cluster B and cluster F. Each of the two second level clusters includes two third-level clusters. For example, cluster B includes cluster A and cluster C. Cluster F includes cluster E and cluster G.

The clustering module 204 creates the hierarchical cluster based on granularity of similarities between the strokes in a field. The clustering module 204 determines a coarsest granularity of similarities, determines a first set of strokes that have distance metrics matching the coarsest granularity of similarities, and classifies the first set of strokes into a first cluster (e.g., a first cluster level). The clustering module 204 then determines a new granularity of similarities by increasing granularity of the coarsest granularity, determines that at least one subset of strokes from the first set of strokes have distance metrics that match the new granularity of similarities, and classifies the at least one subset of strokes into at least one cluster. The at least one cluster is nested by the first cluster and is a cluster finer than the first cluster (e.g., a second cluster level). The clustering module 204 repeats the process of increasing the granularity of similarities and determining new clusters based on the increased granularity until a finest granularity of similarities and at least one finest cluster corresponding to the finest granularity are determined.

The following is an example illustrating the above process for creating a hierarchical cluster. The clustering module 204 creates a hierarchical cluster for 100 separate strokes (e.g. a single stroke or a group of strokes) included in a field from forms. The clustering module 204 first determines that 60 strokes out of the 100 strokes are similar. For example, the clustering module 204 determines that distance metrics between these 60 strokes are less than a threshold value of 20 (e.g., the coarsest granularity of similarities in this system). Persons of ordinary skill in the art will recognize that the threshold value could be a different value based on a different range. The clustering module 204 classifies the 60 strokes in the first cluster level, e.g., cluster D in FIG. 3A.

The clustering module 204 then determines that 20 strokes out of the 60 strokes are similar to each other with the distance metrics being 10. The clustering module 204 also determines that the remaining 30 strokes out of the 60 strokes are similar to each other with distance metrics being 10. The clustering module 204 classifies the 20 strokes and the 30 strokes out of the 60 strokes into two clusters in the second level respectively, e.g., cluster B and cluster F in FIG. 3A. The clustering module 204 does not classify the remaining 10 strokes out of the 60 strokes into cluster B or cluster F because the distance metrics between the 10 strokes and the strokes in cluster B or F greater than 10. The clustering module 204 also does not classify the 10 strokes into a new cluster because the distance metrics between each other of the 10 strokes are larger than 10.

For cluster B, the clustering module 204 determines that eight strokes out of the strokes are similar to each other with distance metrics being five, and another seven strokes out of the 20 strokes are similar to each other with distance metrics being five. The clustering module 204 classifies the eight strokes and the seven strokes out of the 20 strokes into two clusters in the third cluster level respectively, e.g., cluster A and cluster C in FIG. 3A. The clustering module 204 does not classify the remaining five strokes to cluster A or cluster C or a new cluster because the distance metrics for the five strokes are larger than five. Similarly, the clustering module 204 determines the third cluster levels E and G for cluster F. The clustering module 204 determines that the distance metric of five is the finest granularity of similarities and completes the creation of the hierarchical cluster.

The resultant hierarchical cluster in FIG. 3A has three levels: cluster D in the first level, clusters B and F in the second level and clusters A, C, E, and G in the third level. The similarity between strokes decreases in the same child cluster, in the same parent cluster and in the other clusters. For example, the strokes in cluster A are most similar to each other. A stroke in cluster A is less similar to the strokes in clusters C and B than to other strokes in cluster A because cluster A and cluster C are children clusters of parent cluster B. A stroke in cluster A is even less similar to the strokes in other clusters (e.g., clusters E, G, F and D) than to the strokes in clusters C and B.

Figure 3B:
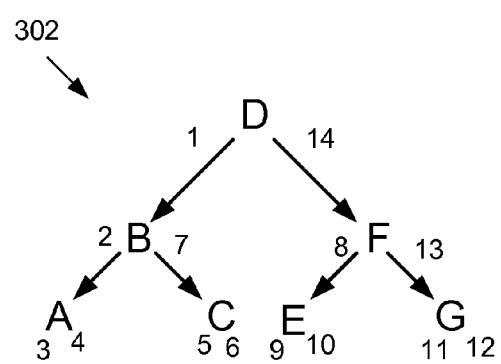
FIG. 3B is a graphic representation of a binary tree that describes the hierarchical cluster.

FIG. 3B depicts a tree 302 that represents the same hierarchical cluster illustrated as a Venn diagram in FIG. 3A. In this example, The parent node, cluster D, is shown being divided into a second cluster level embodiment for clusters B and F and a third cluster level embodiment for clusters A, C, E and G. The numbers in the tree represent the order of traversing the tree. In this example, the clustering module 204 assigns a current index to the left to process the left child, process the right child, and assign the current index to the right. The indices also describe the order of nesting. For example, cluster A has left 3 and right index 4. Cluster B, which contains cluster A, has left index 2 and right index 7.

Figure 3C:
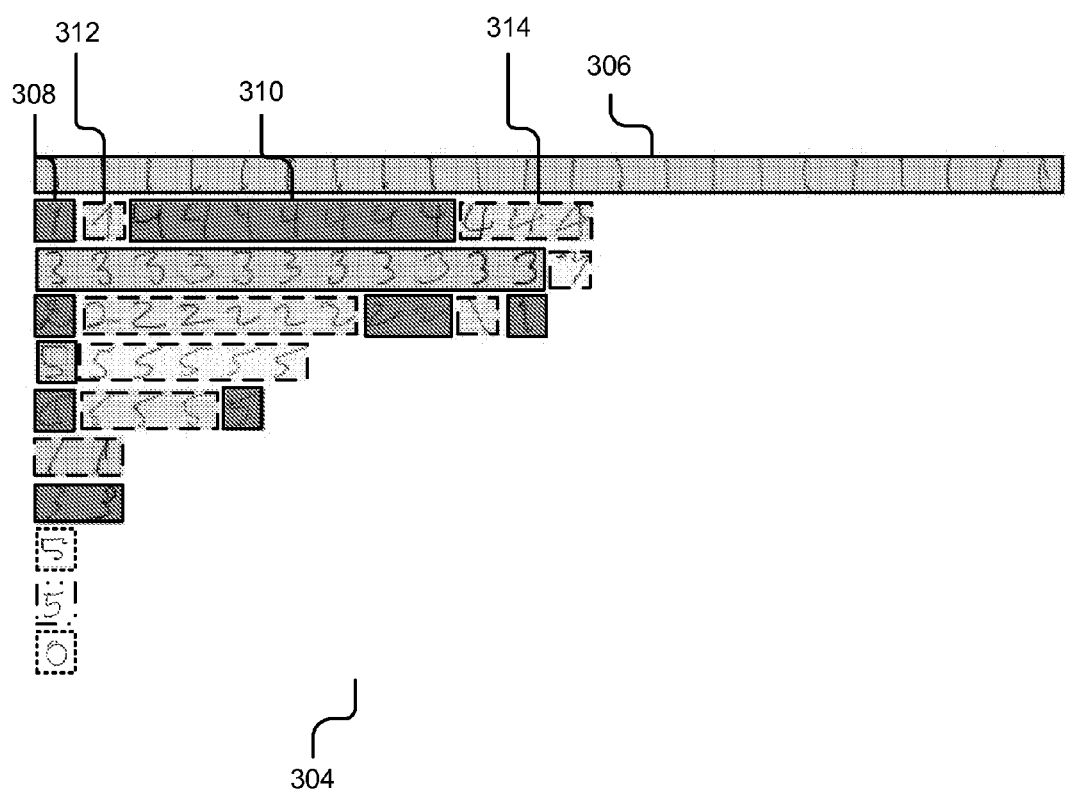
FIG. 3C is a graphic representation of a first example hierarchical cluster.

FIG. 3C depicts an example hierarchical cluster 304 including multiple example strokes. The hierarchical cluster 304 includes two levels of clusters. Each row includes clusters in a first level. For example, the hierarchical cluster 304 includes a first level cluster 306 in the first row. Similarly, the second row (which consists of regions 308, 312, 310, and 314) is a first level cluster. A region encompassed with a solid line or a dashed line in a row is a cluster in a second level. For example, the region 308 (e.g., in a solid line) in the second row represents a cluster in the second level. The region 310 with a solid line and regions 312 and 314 with dashed lines in the second row each represent a second level cluster. These four second level clusters are nested in the first level cluster and are a finer level of clusters than the first level cluster. For example, the clustering module 204 specifies the second row including regions 308, 310, 312 and 314 as a first level cluster because the strokes in the regions 308, 310, 312 and 314 are more similar to each other than to other strokes of other clusters in other rows. The clustering module 204 further classifies the regions 308 as a second level cluster because the strokes in the region 308 are more similar to each other than to the strokes in the regions 310, 312 and 314.

Figure 3D:
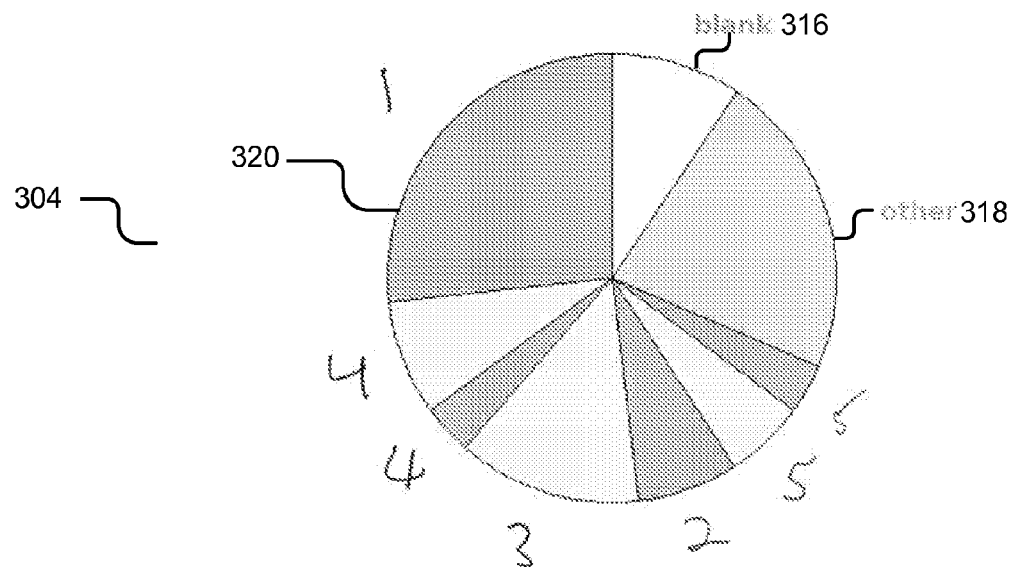
FIGS. 3D and 3E are graphic representations of pie charts for representing hierarchical clusters for numbers and checkboxes, respectively.

FIG. 3D depicts a pie chart of the same hierarchical cluster 304 as shown in FIG. 3C. The clustering module 204 creates the hierarchical cluster 304 based on the strokes included in a field in a set of forms. The groups other than the "blank" slice 316 and the "other" slice 318 have at least three separate strokes in the cluster. The "blank" slice 316 represents the forms in the set that are blank in the field.

The "other" slice 318 represents smaller clusters including strokes that were not clustered because they were too different to have their own group. The clusters in FIG. 3D correspond to the boxed numbers in FIG. 3C. The "other" slice in FIG. 3D includes the one or two-stroke clusters. It includes the clusters represented with a solid line in the second row for "4" 308, the fourth row for a first "2," a second "2" and "1," the fifth row for "5," the sixth row for a first "5" and a second "5" and the eighth row for "3". It includes the clusters represented with a dashed line in the second row for "1," the third row for "3," the fourth row for "1" and the seventh row for "1" in FIG. 3C which are small clusters with one and two strokes. The "other" slice also includes the three strokes show in the last three rows which did not cluster with any other strokes and are each a one-stroke small cluster. The size of the "other" slice 318 is the summation of the fifteen small clusters illustrated in FIG. 3C and therefore includes eighteen strokes. The rest of slices in the pie chart represent clusters that have three or more strokes. Each slice is represented by an example stroke. For example, the slice 320 includes an example stroke "1" that is from the cluster shown in the first row of FIG. 3C.

In another embodiment, the clustering module 204 performs agglomerative hierarchical clustering. The clustering module 204 starts with the two closest strokes, and performs a step-by-step analysis to find the next closest stroke, either by creating new clusters of size 2, adding a stroke to an existing cluster or joining two clusters. Eventually, strokes are so different that a stopping criterion is reached. Then early (fine) clusters are discarded so the maximum number of clusters is less than a threshold and the distance metric for the finest cluster is above a threshold.

More specifically, the clustering module 204 computes the distance between every pair of strokes. Initially, every stroke is assigned to its own cluster, which is called a singleton. If there are 100 strokes, then there are 100 clusters at the finest level, all singletons. The two strokes with the smallest distances are assigned to a cluster. Creation of clusters from fine to coarse continues in order of increasing distance. New coarser clusters are created either by creating new clusters of size 2, by adding a stroke to an existing cluster or by joining two clusters. To find the minimum distance as clustering continues, distances between both singletons and clusters of multiple strokes are considered. When computing the distance to a cluster of multiple strokes, in one embodiment, the clustering module 204 computes the average distance between a stroke and each stroke in a cluster.

In one embodiment, the clustering module 204 continues to perform agglomerative hierarchical clustering until a cluster containing every stroke is created. In another embodiment, the clustering module 204 stops the clustering when a criterion is reached, for example, using the L-method or Average Silhouette. In yet another embodiment, the clustering module 204 stops the clustering process when a threshold inter-cluster distance is reached, for example, a threshold value of 20. In one embodiment, where the clustering module 204 stops clustering, singleton clusters are ignored. A cluster that is ignored is neither stored nor used in further processing.

In one embodiment, fine clusters from agglomerative hierarchical clustering are ignored. In one embodiment, the choice of what clusters to ignore is based on a distance metric and clusters with a distance metric less than a threshold are ignored, for example a threshold value of 2. In another embodiment, a threshold of the maximum number of clusters, for example 200, is used to limit the number of clusters.

Figure 3E:
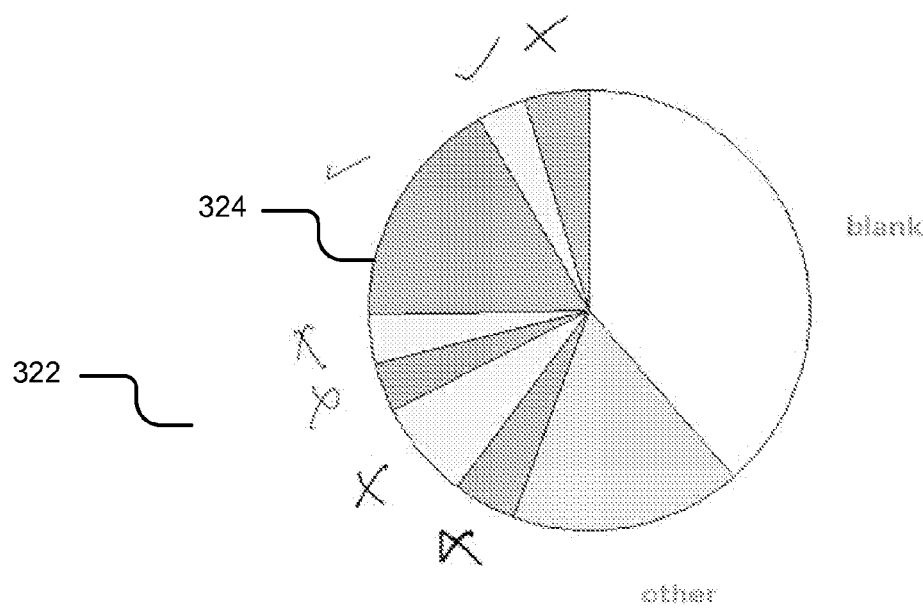

The clustering module 204 creates clusters based on strokes included in a field. The strokes in the field can be alphabetical characters, numbers and other types of strokes. FIG. 3E depicts clusters 322 for checkmarks and "x" marks in a pie chart. Except for the "blank" slice, which represents empty fields, and the "other slice," which represents multiple small clusters, each slice in the pie chart represents a single cluster. For example, the slice 324 is a cluster for some handwritten checkmarks.

The clustering module 204 creates clusters based on strokes in a field in a set of forms that save computational time during processing of the stroke data. For example, when creating clusters for strokes including both alphabetical characters and numbers, the cluster engine 204 will spend more time in determining similarities between two types of strokes and thereby consume more time in creating the clusters for the two types of strokes than creating clusters for a field including only alphabetical characters. Creating clusters based on a field also increases accuracy efficiency. For example, when creating clusters for alphabetical characters in a field, the clustering module 204 will be more accurate in determining similarities between alphabetical characters than determining similarities between both alphabetical characters and numbers, and thereby increases the accuracy.

In one embodiment, the clustering module 204 creates clusters based on strokes included in multiple fields of a form as long as these fields include similar data. For example, the cluster engine 204 identifies two fields that are both filled out with a number between 1 and 5 and creates clusters based on characters included in these two fields. Conversely, the clustering module 204 would not cluster the name field and the signature field because even though the words have the same meaning, a person might use printed strokes for the name field and cursive for the signature field.

In one embodiment, the clustering module 204 identifies the symbolic representations of the strokes (e.g., machine encoded text such as Universal Character Set Transformation Format 8-bit (UTF-8)) from the set of forms based on clusters. For example, the clustering module 204 converts an example stroke of a cluster to symbolic data. This is used by the query engine 206 to match a textual query to the symbolic representation. The query engine 206 then returns the clusters as search results.

When a large amount of data is available, the clustering module 204 may create clusters based on a subset of the data to save computational time. The clustering module 204 then uses the clusters created based on the subset to train a handwriting recognition algorithm, and uses a fast and low memory algorithm (e.g., a nearest neighbor algorithm) to cluster the rest of large amount of data or any new data. For example, the clustering module 204 creates clusters for strokes included in one or more fields in a set of forms. When receiving a second form with new strokes, the clustering module 204 trains a handwriting recognition algorithm by creating a statistical model using existing clusters (e.g., created based on the set of forms) and cluster statistics, determines that the new strokes are similar to the strokes in the set of forms based on running a nearest neighbor algorithm, and assigns the new strokes to the existing clusters based on the statistical model.

The query engine 206 is software and routines for handling a query received from a user based on cluster information. In one embodiment, the query engine 206 is a set of instructions executable by the processor 240 to provide the functionality described below for handling a query received from a user based on cluster information. In another embodiment, the query engine 206 is stored in the memory 245 and is accessible and executable by the processor 240. In either embodiment, the query engine 206 is adapted for cooperation and communication with the processor 240, the communication unit 255 and other components of the electronic writing solution server 106.

In one embodiment, the query engine 206 receives a search query that includes at least a first stroke from a user. In one embodiment, the first stroke is included in one or more fields in a set of forms. For example, the query engine 206 receives a query for searching a handwritten number included in an age field of a set of forms. In another embodiment, query is a result for results in a particular field. For example, the query is for all examples of prescriptions from Dr. Jones for Oxycontin. In response to receiving the search query, the query engine 206 queries a database and retrieves one or more clusters from the database. Each cluster includes example strokes that are similar to the first stroke at a level. For example, the query engine 206 retrieves a first cluster and a second cluster from a database in response to receiving a search query. The first cluster includes an example stroke that is similar to the first stroke in a coarse granularity. The second cluster includes an example stroke that is similar to the first stroke in a fine granularity. The query engine 206 communicates with the user interface engine 208 to generate graphical data for displaying the example strokes to the user and receiving user selections for strokes of interest. The strokes of interest are example strokes that the user is interested in. For example, a user is interested in the example stroke in one of clusters because the user thinks that this particular example stroke is most similar to the first stroke in the search query. In response to receiving the selections of strokes of interest, the query engine 206 retrieves information associated with the strokes of interest from the database. In one embodiment, the query engine 206 retrieves one or more forms that include the strokes of interest from the database. The one or more forms are used by the clustering module 204 to create the one or more clusters retrieved by the query engine 206.

In another embodiment, the query engine 206 also retrieves statistical information associated with the strokes of interest such as how many forms include the strokes of interest, metadata information such as when and where the forms that include the strokes of interest were filled out and other information such as the hierarchical structure of clusters that include the strokes of interest. The query engine 206 instructs the user interface engine 208 to generate graphical data for displaying the retrieved information to the user.

The query engine 206 handles search queries in various cases. In one example, a hospital administrator wants to know how many patients treated by Doctor Smith have the symptom of a runny nose. The query engine 206 receives a query from the administrator for searching patients' medical records. The query includes a handwritten "runny nose." The strokes are extracted from a symptom field in a patient medical record that was filled out by Dr. Smith. In response to receiving the search query, the query engine 206 queries a database. The database stores medical records and clusters created based on the symptom field of the medical records by the clustering module 204. The query engine 206 retrieves three clusters from the database. Each cluster includes an example handwritten "runny nose" that is similar to Dr. Smith's handwritten "runny nose." The administrator determines that the example handwriting in the second cluster looks the same as Dr. Smith's handwritten "runny nose." The query engine 206 receives the administrator's selection for the example handwriting in the second cluster and retrieves the patients' medical records that include the example handwriting. From the retrieved medical records, the administrator knows which patients treated by Dr. Smith had the symptom of a runny nose. In another example, a banker receives a document signed by John and is suspicious that it is a fake signature. The query engine 206 receives a search query including this suspicious signature or a request for signatures from John and retrieves clusters that match the query. If the signature included in the search query is different from the signatures included in the clusters, the signature is a forgery.

Since the query engine 206 handles a search query based on clusters created from strokes associated with a particular field, the search result is simplified and accurate. For example, if the query engine 206 receives a query for searching "Bill" in a name field, the query engine 206 will query the database for clusters created based on strokes in the name field. This avoids a problem where if all fields in the form were searched, the word "Bill" could have a different context, for example, if "Bill" appeared in a comment section of a medical form.

In another embodiment, the query engine 206 receives a browse query from a user for browsing clusters. For example, if a user wants to know how other people write the number "one," the user initiates a browse query for the clusters including the handwritten number "one." In response to receiving the browse query, the query engine 206 queries a database and retrieves the clusters from the database. In one embodiment, the retrieved clusters have different levels. The query engine 206 identifies a current level of the clusters and retrieves the current level of the clusters from the database. The query engine 206 communicates with the user interface engine 208 to generate graphical data for displaying a set of example strokes from the current level of the clusters to the user and receiving a selection for an example stroke in the set of example strokes from the user. For example, the query engine 206 retrieves the first level cluster of a two-level cluster from a database. The query engine 206 communicates with the user interface engine 208 to display the four example strokes in the first level cluster to a user. The four example strokes include handwritten number "1," "2," "3" and "4." The user wants to browse clusters including the number "3." The query engine 206 receives a selection of the number "3" from the user.

In response to receiving the selection for the example stroke, the query engine 206 determines whether there is a subset level of the current level of the clusters that includes the example stroke. If the query engine 206 determines that there is a subset level, the query engine 206 changes the subset level to the current level in the user interface and repeats the process above for presenting the example strokes in the current level to the user and receiving the selection for an example stroke in the current level from the user until there is no subset level. Continuing with the above example, the query engine 206 determines that there is a second level cluster that includes the number "3" and communicates with the user interface engine 208 to display the second level cluster and associated example strokes. The query engine 206 then determines whether the second level cluster includes a subset level cluster. If the second level cluster has a subset level cluster (e.g., a third level cluster), the query engine 206 repeats above procedure for displaying the example strokes and receiving selection of an example strokes.

Once the query engine 206 determines that there is no subset level cluster, the query engine 206 retrieves information associated with the example stroke from the database. In one embodiment, the query engine 206 retrieves one or more forms that include the example stroke from the database. In another embodiment, the query engine 206 also retrieves statistical information associated with the example stroke such as how many forms include the example stroke, metadata information such as when and where the forms that include the example stroke were filled out and other information such as a table summarizing the one or more forms. The query engine 206 communicates with the user interface engine 208 to present the retrieved information to the user.

The user interface engine 208 is software and routines for generating graphical data for displaying a user interface. In one embodiment, the user interface engine 208 is a set of instructions executable by the processor 240 to provide the functionality described below for generating the user interface. In another embodiment, the user interface engine 208 is stored in the memory 245 and is accessible and executable by the processor 240. In either embodiment, the user interface engine 208 is adapted for cooperation and communication with the processor 240, the communication unit 255 and other components of the electronic writing solution server 106.

In one embodiment, the user interface engine 208 generates graphical data for displaying example strokes of a cluster to a user. In another embodiment, the user interface engine 208 generates graphical data for receiving user input, for example, a user selection for an example stroke in a cluster. In yet another embodiment, the user interface engine 208 generates graphical data for presenting a query result to a user. The query result is generated by the query engine handling a search query or a browse query.

Methods

Figure 4:
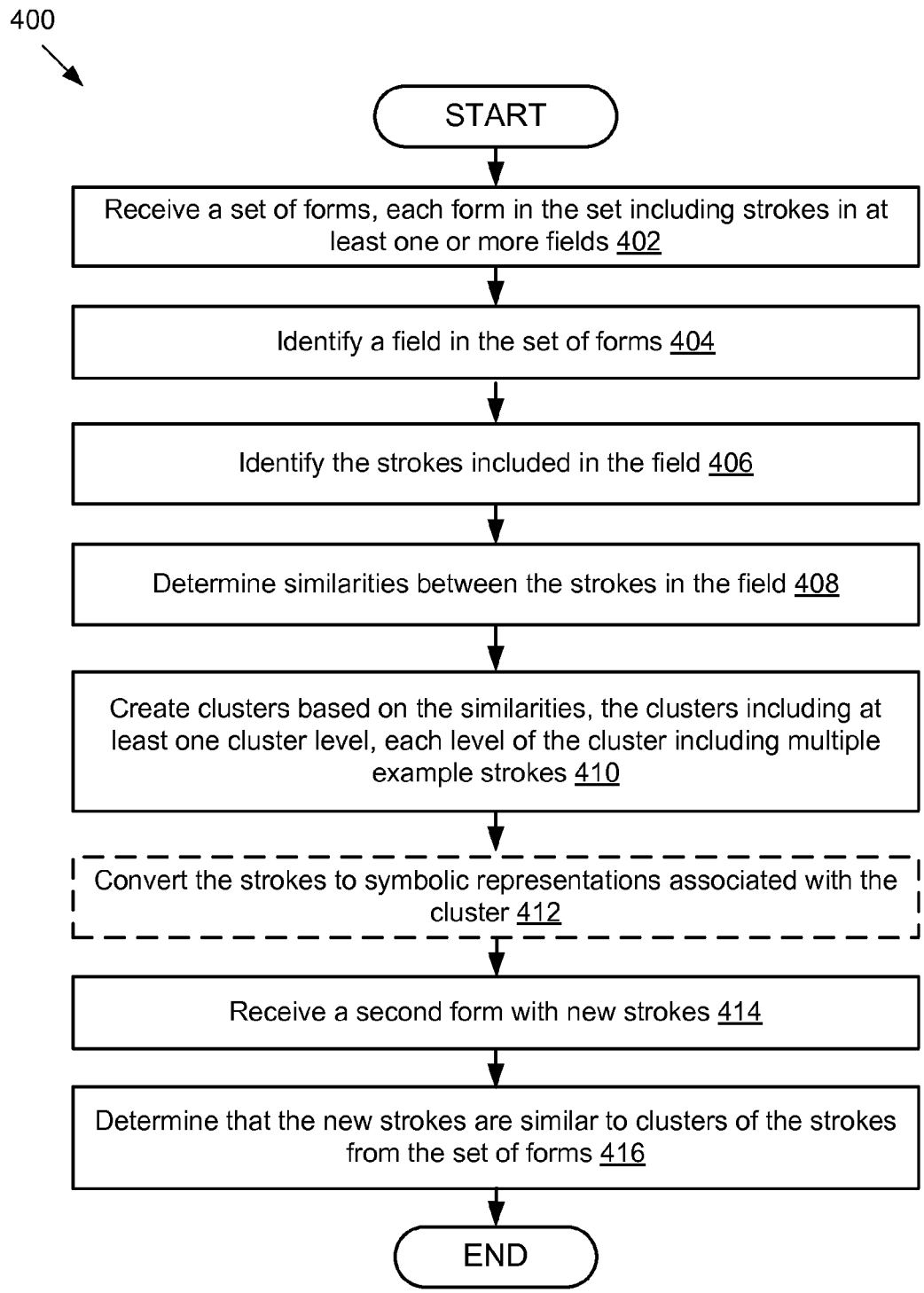
FIG. 4 is a flow diagram of one embodiment of a method for creating clusters from a set of forms.
Figure 5A:
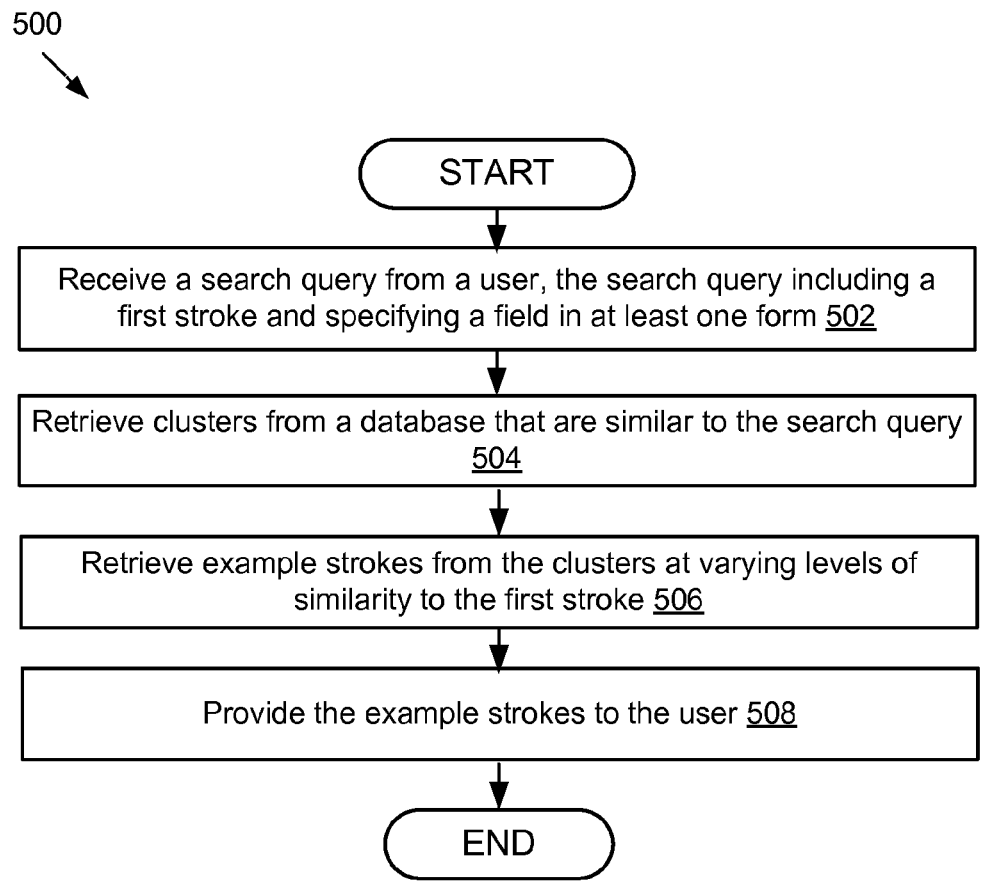
FIG. 5A is a flow diagram of one embodiment of a method for searching a stroke based on clusters.
Figure 5B:
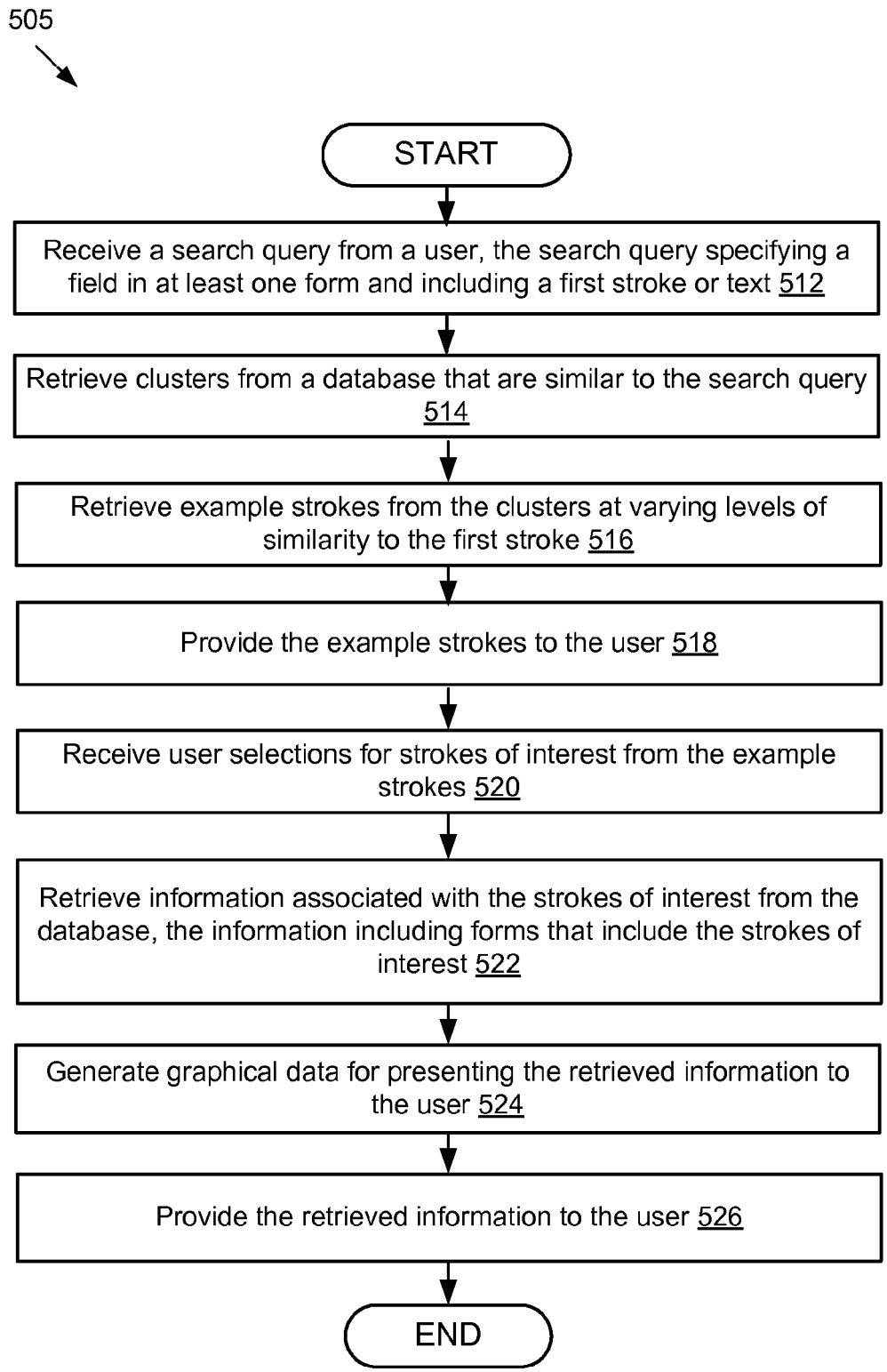
FIG. 5B is a flow diagram of another embodiment of a method for searching a stroke based on clusters.

Referring now to FIGS. 4, 5A and 5B, the methods of the invention will be described in more detail. FIG. 4 is a flow diagram 400 that illustrates one embodiment of a method for creating clusters. The search by stroke application 105 includes a controller 202, a stroke identifier 203 and a clustering module 204. The controller 202 receives 402 a set of forms, each form in the set including strokes in at least one or more fields. The controller 202 transmits the set of forms to the stroke identifier 203, which identifies 404 a field in the set of forms. In one embodiment, the stroke identifier 203 receives the set of forms and stroke information from the portable computing devices 102 or stroke capture devices 101 via the controller 202, and identifies a field in the set of forms that includes strokes. In one embodiment, the stroke identifier 203 receives the set of forms that includes more than one type of form, determines common fields in the more than one type of form and selects a field from the common fields. The stroke identifier 203 identifies 406 the strokes included in the field.

The clustering module 204 determines 408 similarities between the strokes in the field. In one embodiment, the clustering module 204 performs feature extraction on the strokes in a field and determines a feature distance between pairs of strokes. For example, the clustering module 204 performs feature extraction on geometric coordinates and timing information of strokes, and computes a feature distance using a dynamic time warping (DTW) algorithm. The clustering module 204 creates 410 clusters based on the similarities, the clusters including at least one cluster level, each level of the cluster including multiple example strokes. In one embodiment, the clustering module 204 creates a hierarchical cluster. Examples of hierarchical clusters are depicted in FIGS. 3A, 3B, 3D and 3E. In another example, the clustering module 204 performs agglomerative hierarchical clustering to create the hierarchical clusters.

The clustering module 204 optionally identifies 412 symbolic representations of the strokes from the set of forms. For example, the clustering module 204 converts an example stroke of a cluster to symbolic data so that if a user provides a search query in the form of a textual query, the query engine can match the text with the symbolic representation. The clustering module 204 receives 414 a second form with new strokes. The clustering module 214 determines 416 that the new strokes are similar to clusters of the strokes from the set of forms. For example, when receiving a second form with new strokes, the clustering module 204 trains a handwriting recognition algorithm by creating a statistical model using existing clusters (e.g., created based on the set of forms) and cluster statistics, determines that the new strokes are similar to clusters of the strokes in the set of forms based on running a nearest neighbor algorithm, and assigns the new strokes to the existing clusters based on the statistical model.

FIG. 5A is a flow diagram 500 that illustrates one embodiment of a method for handling a search query. The search by stroke application 105 includes a query engine 206 and a user interface engine 208. The query engine 206 receives 502 a search query from a user, the search query specifying a field in at least one form and including a first stroke or text. The query engine 206 retrieves 504 clusters from a database that are similar to the search query. The query engine 204 retrieves 506 example strokes from the clusters at varying levels of similarity to the first stroke. For example, the query engine 206 retrieves a first cluster and a second cluster from a database in response to receiving a search query. The first cluster includes an example stroke that is similar to the first stroke in a coarse granularity. The second cluster includes an example stroke that is similar to the first stroke in a fine granularity.

FIG. 5B is a flow diagram 505 that illustrates another embodiment of a method for handling a search query. The search by stroke application 105 includes a query engine 206 and a user interface engine 208. The query engine 206 receives 512 a search query from a user, the search query specifying a field in at least one form and including a first stroke or text. The query engine 206 retrieves 514 clusters from a database that are similar to the search query. The query engine 204 retrieves 516 example strokes from the clusters at varying levels of similarity to the first stroke. For example, the query engine 206 retrieves a first cluster and a second cluster from a database in response to receiving a search query. The first cluster includes an example stroke that is similar to the first stroke in a coarse granularity. The second cluster includes an example stroke that is similar to the first stroke in a fine granularity. The query engine 206 instructs the user interface engine 208 to generate graphical data for displaying the example strokes to the user. The user interface engine 208 provides 518 the example strokes to the user via the communication unit 255. The query engine 206 receives 520 user selections for strokes of interest from the example strokes. The strokes of interest are example strokes that the user is interested in. The query engine 206 retrieves 522 information associated with the strokes of interest from the database, the information including forms that include the strokes of interest. In one embodiment, the query engine 206 also retrieves statistical information associated with the strokes of interest such as how many forms include the strokes of interest, metadata such as when and where the forms that include the strokes of interest were filled out and other information such as the hierarchical structure of clusters that include the strokes of interest. The query engine 206 instructs the user interface engine 208 to generate 524 graphical data for presenting the retrieved information to the user. The user interface engine 208 provides 516 the retrieved information to the user.

Figure 5C:
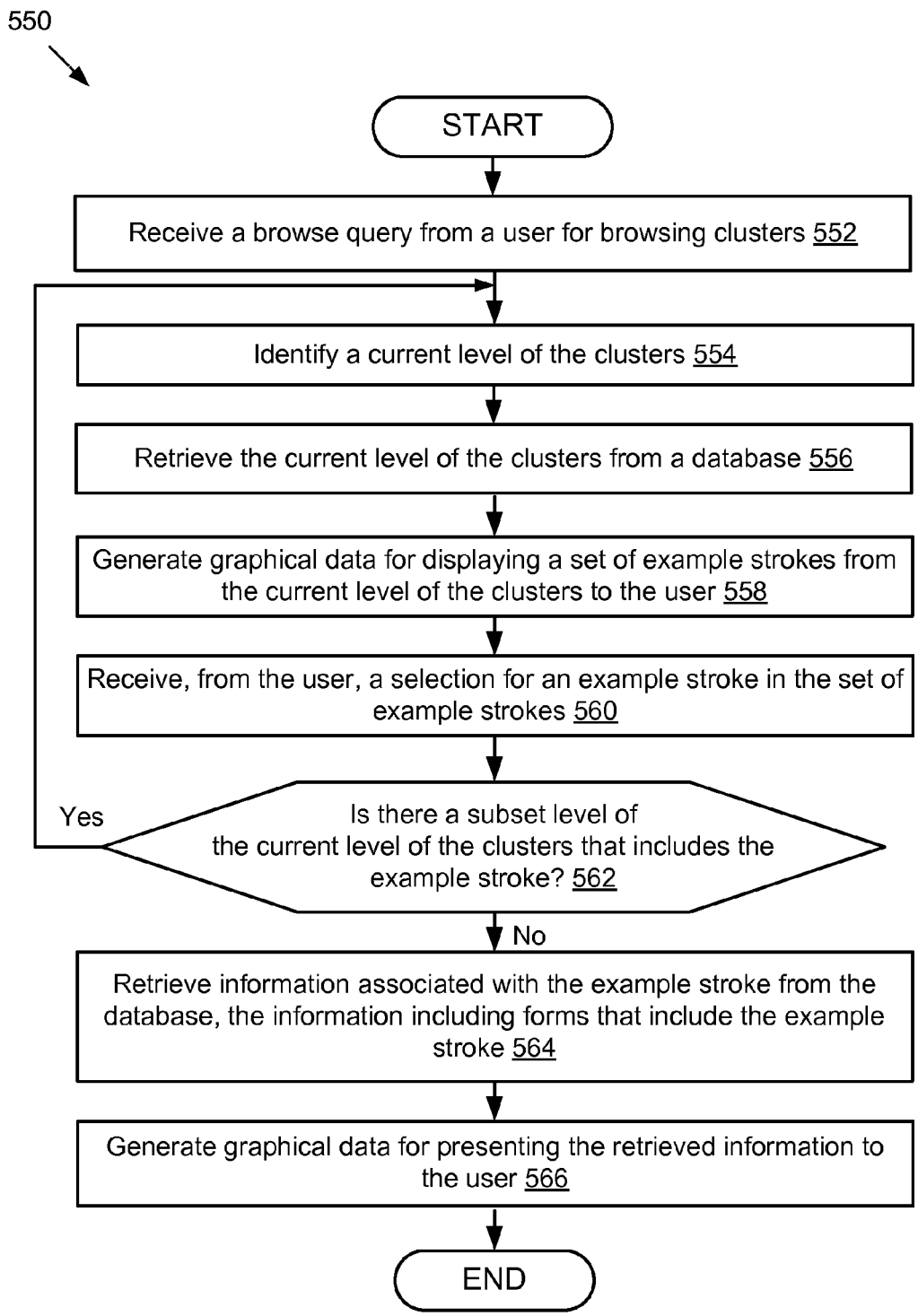
FIG. 5C is a flow diagram of one embodiment of a method for browsing clusters.

FIG. 5C is a flow diagram 550 that illustrates one embodiment of a method for handling a browse query. The search by stroke application 105 includes a query engine 206 and a user interface engine 208. The query engine 206 receives 552 a browse query from a user for browsing clusters. For example, if a user wants to know how other people write the number "1," the user initiates a browse query for the clusters including the handwritten number "1." The query engine 206 identifies 554 a current level of the clusters. The query engine 206 retrieves 556 the current level of the clusters from a database. The query engine 206 instructs the user interface engine 208 to generate 558 graphical data for displaying a set of example strokes form the current level of the clusters to the user. The query engine 206 receives 560, from the user, a selection for an example stroke in the set of example strokes. The query engine 206 determines 562 whether there is a subset level of the current level of the clusters that includes the example strokes. If the query engine 206 determines that there is a subset level cluster that includes the example stroke, the method 550 repeats steps 554-560. Otherwise the method goes to step 564. The query engine 206 retrieves 564 information associated with the example stroke from the database, the information including forms that include the example stroke. The query engine 206 instructs the user interface engine 208 to generate 566 graphical data for presenting the retrieved information to the user.

Example Queries and Query Results

Figure 6A:
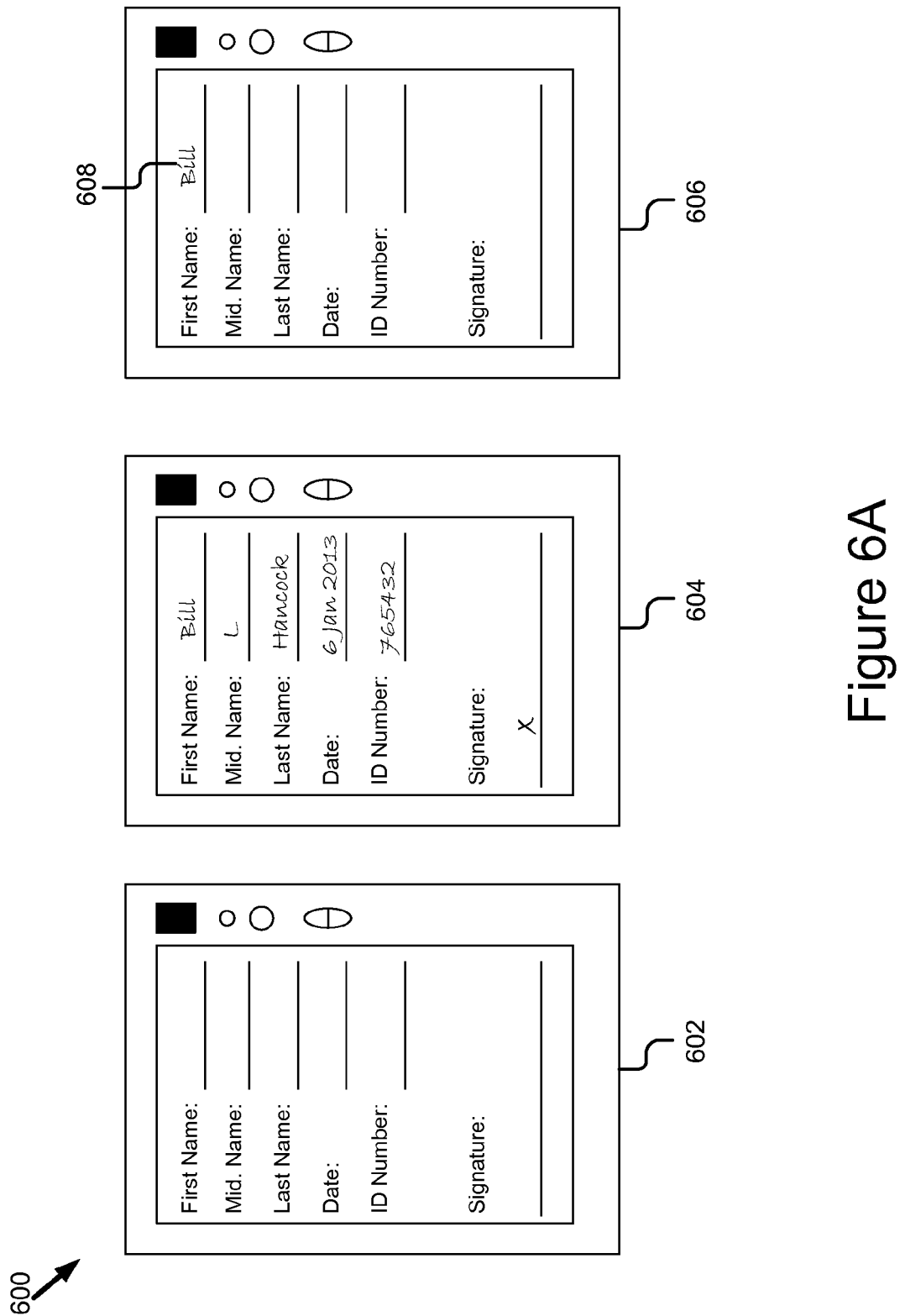
FIG. 6A is a graphic representation of example forms.

FIG. 6A is a graphic representation 600 of example forms. The first form on the left-hand side is a blank form 602. The blank form 602 includes fields such as a first name, a middle name, a last name, a date, an identification number and a signature. The second form in the middle is a completed form 604. The form was filled out by Bill L. Hancock. The third form on the right-hand side is a search query 608 that is specified on a form. The search query 608 is used to search for other examples of the handwritten name "Bill."

Figure 6B:
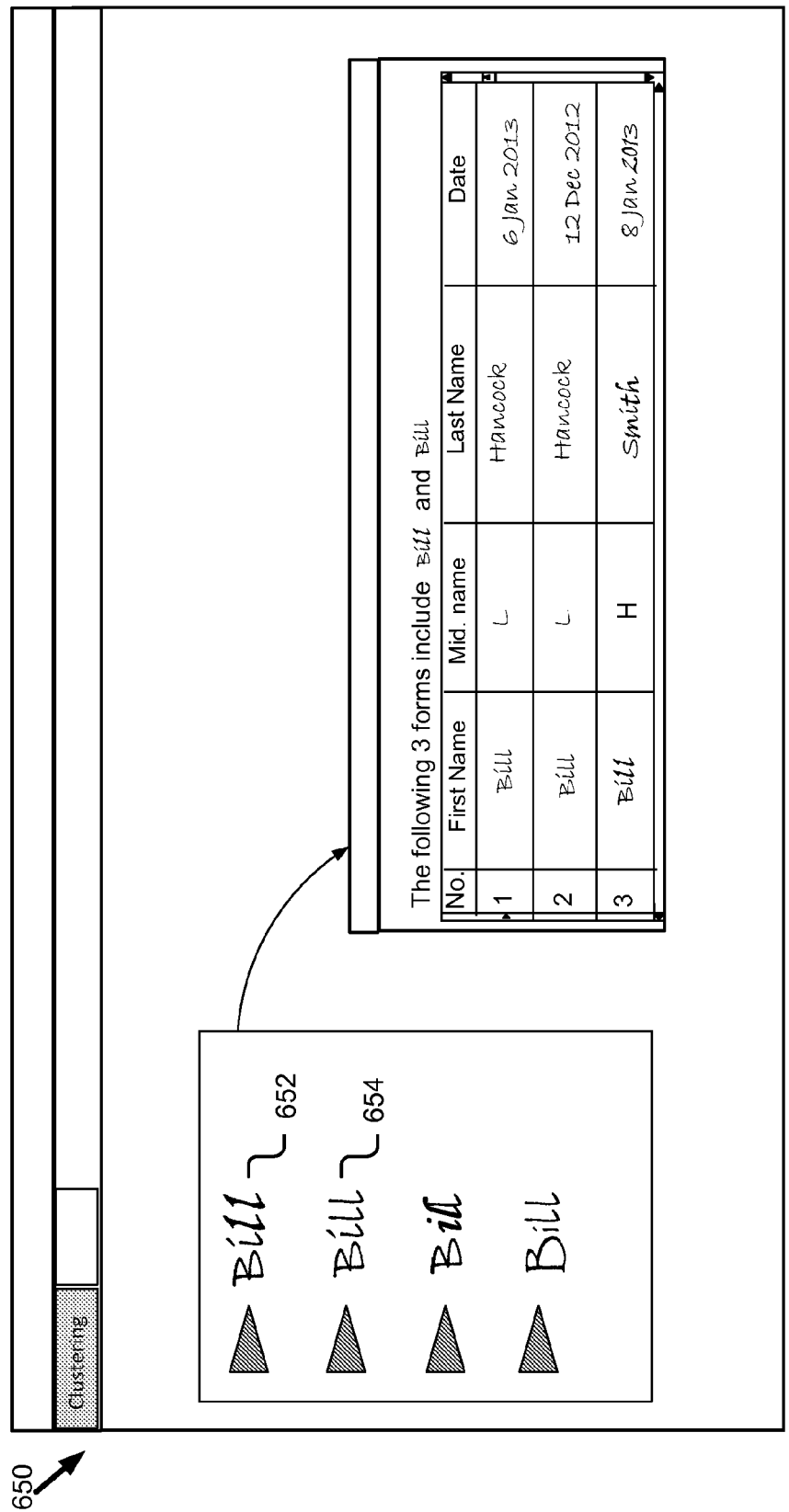
FIG. 6B is a graphic representation of example results for searching a stroke.

FIG. 6B is an example of a graphic representation of a user interface 650. The user interface 650 includes a search result generated from the search query 608 in FIG. 6A. The left-hand side of the user interface 650 shows four examples of handwriting for "Bill" in a set of clusters. Each of the four handwritten Bills is similar to the "Bill" in the search query 608 at a first cluster level. The user, who sent the search query 608, determines that the first two examples of handwriting 652 and 654 in the cluster are strokes of interest (e.g., maybe because the user thinks that names 652 and 654 are most similar to the name in the search query 608). The query engine 206 retrieves a table from the database and communicates with the user interface 208 to generate graphical data for displaying the table in the right-hand side of the user interface 650. The table lists three forms that include the strokes of interest, e.g., handwriting 652 and 654.

Figure 7:
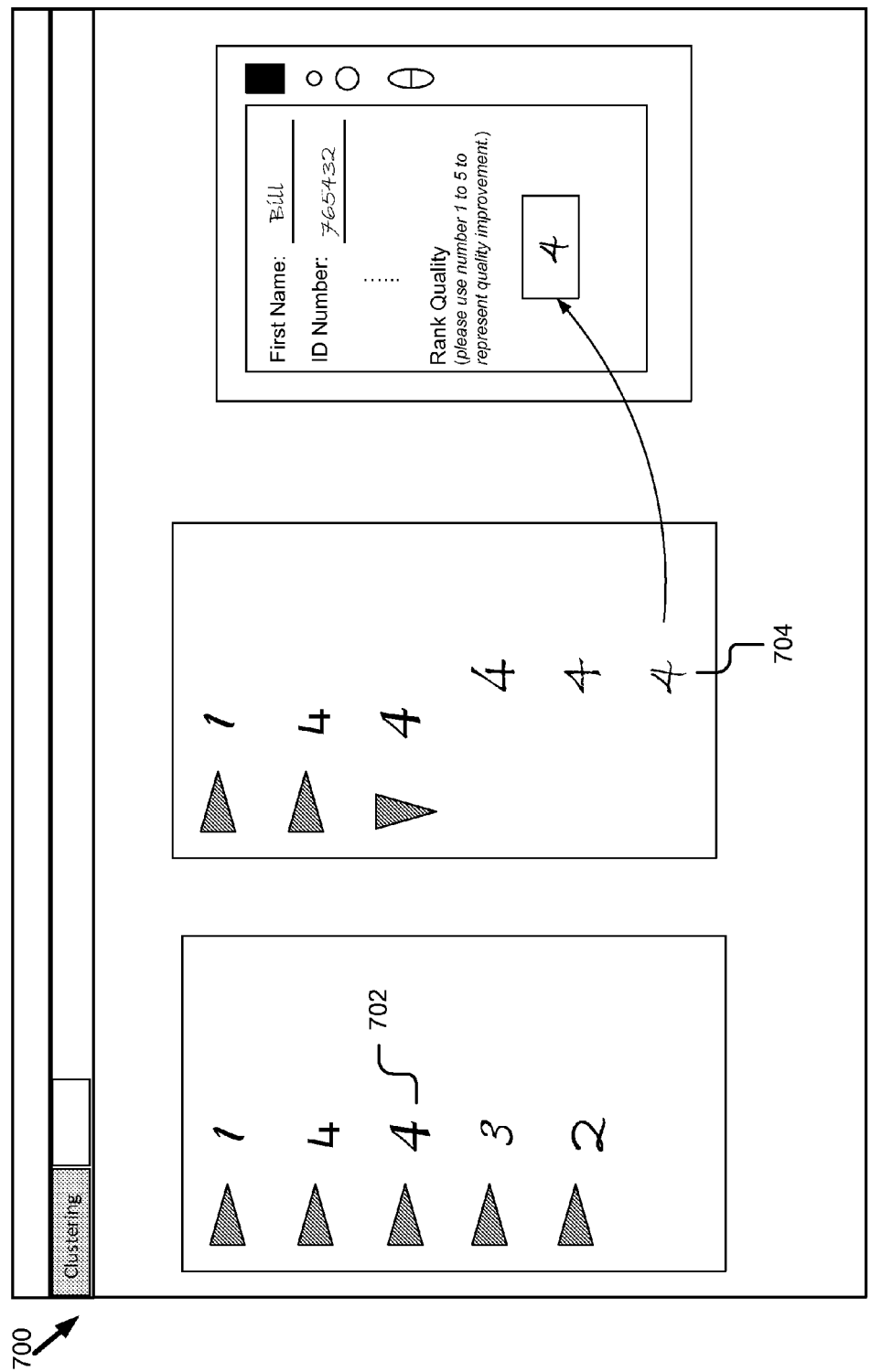
FIG. 7 is a graphic representation of example results for browsing clusters.

FIG. 7 is an example of a graphic representation of a user interface 700. The user interface 700 includes a browse result generated by the query engine 206 in response to receiving a browse query. A user sent the query for browsing clusters created based on strokes in a year field in a set of forms by the clustering module 204. The left-hand side of the user interface 700 includes a first cluster level that includes a list of five example strokes. The user, who sent the browse query, selects a third example stroke 702 from the list. In response to receiving the selection of stroke 702, the query engine 206 retrieves examples from a second cluster level (e.g., the subset level of the first cluster level) that includes the stroke 702 from the database. The middle of the user interface 700 includes the second cluster level with three example strokes. The user selects the example stroke 704 from the three example strokes. In response to receiving the selection of the stroke 704, the query engine 206 determines that no further subset exists and thereby retrieves information associated with the example stroke 704. In this example, the query engine 206 retrieves a form that includes the example stroke 704, which is displayed in the right-hand side of the user interface 700.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
    identifying, using one or more computing devices, a field in a set of forms and strokes included in the field;
    determining, using the one or more computing devices, distance metrics between the strokes;
    creating, using the one or more computing devices, a hierarchical cluster for the strokes included in the field based on the distance metrics;
    receiving a search query from a first user, the search query including a first stroke extracted from the field of a form filled out by a second user;
    retrieving, using the one or more computing devices, a cluster from the hierarchical cluster and example strokes of the cluster similar to the search query;
    providing the example strokes to the first user;
    receiving, from the first user, a selection of a first example stroke from the provided example strokes; and
    responsive to receiving, from the first user, the selection of the first example stroke, retrieving a table listing a number of forms in the set of forms that were filled out by the second user and have strokes similar to the first example stroke.

2. The method of claim 1, further comprising training a handwriting recognition algorithm using the hierarchical cluster to recognize and cluster new strokes.

3. The method of claim 1,
    wherein creating the hierarchical cluster for the strokes in the field based on the distance metrics comprises clustering two closest strokes with a minimal distance metric and clustering next closest strokes until a stopping criterion is reached.

4. The method of claim 1, wherein determining the distance metrics between the strokes further comprises:
    performing feature extraction on the strokes included in the field; and
    determining a feature distance between pairs of strokes.

5. The method of claim 3, wherein the stopping criterion includes at least one of a threshold inter-cluster distance or a threshold number of clusters.

6. The method of claim 1, wherein the hierarchical cluster includes at least one cluster level.

7. The method of claim 1, further comprising:
    receiving a browse query from the first user;
    determining the hierarchical cluster and associated example strokes for displaying to the first user;
    receiving a selection of a second example stroke from the first user; and
    retrieving information associated with the second example stroke for the first user.

8. The method of claim 1,
    wherein identifying the strokes included in the field comprises identifying stroke pixels based on at least one of pixel intensities and pixel colors.

9. The method of claim 1,
    wherein the search query includes text; and
    wherein retrieving the cluster comprises converting the example strokes of the cluster to symbolic representations, determining that the symbolic representations match the text included in the search query, and retrieving the cluster based on the match.

10. A system comprising:
    one or more processors;
    a cluster module stored on a memory and executable by the one or more processors, the cluster module configured to identify a field in a set of forms and strokes included in the field, determine distance metrics between the strokes, and create a hierarchical cluster for the strokes included in the field based on the distance metrics;
    a query engine stored on the memory and executable by the one or more processors, the query engine configured to receive a search query from a first user, the search query including a first stroke extracted from the field of a form filled out by a second user, retrieve a cluster from the hierarchical cluster and example strokes of the cluster similar to the search query; and
    a user interface engine configured to provide the example strokes to the first user, receive a selection of a first example stroke from the provided example strokes, and responsive to receiving the selection of the first example stroke, retrieving a table listing a number of forms in the set of forms that were filled out by the second user and have strokes similar to the first example stroke.

11. The system of claim 10, wherein the cluster module is further configured to train a handwriting recognition algorithm using the hierarchical cluster to recognize and cluster new strokes.

12. The system of claim 10,
    wherein to create the hierarchical cluster for the strokes in the field based on the distance metrics, the cluster module is configured to cluster two closest strokes with a minimal distance metric and cluster next closest strokes until a stopping criterion is reached.

13. The system of claim 12, wherein the stopping criterion includes at least one of a threshold inter-cluster distance or a threshold number of clusters.

14. The system of claim 10, wherein to determine the distance metrics between the strokes, the cluster module is configured to:
    perform feature extraction on the strokes included in the field; and
    determine a feature distance between pairs of strokes.

15. The system of claim 10, wherein the hierarchical cluster includes at least one cluster level.

16. A computer program product comprising a non-transitory computer useable medium including a computer readable program, wherein the computer readable program when executed on a computer causes the computer to:
identify a field in a set of forms and strokes included in the field;
determine distance metrics between the strokes;
create a hierarchical cluster for the strokes included in the field based on the distance metrics;
receive a search query from a first user, the search query including a first stroke extracted from the field of a form filled out by a second user;
retrieve a cluster from the hierarchical cluster and example strokes of the cluster similar to the search query;
provide the example strokes to the first user;
receive, from the first user, a selection of a first example stroke from the provided example strokes; and
responsive to receiving the selection, from the first user, of the first example stroke, retrieve a table listing a number of forms in the set of forms that were filled out by the second user and have strokes similar to the first example stroke.

17. The computer program product of claim 16, wherein the computer readable program, when executed on the computer, further causes the computer to train a handwriting recognition algorithm using the hierarchical cluster to recognize and cluster new strokes.

18. The computer program product of claim 16, wherein to create the hierarchical cluster for the strokes in the field based on the distance metric, the computer readable program causes the computer to cluster two closest strokes with a minimal distance metric and cluster next closest strokes until a stopping criterion is reached.

19. The computer program product of claim 16, wherein to determine the distance metrics between the strokes, the computer readable program causes the computer to:
perform feature extraction on the strokes included in the field; and
determine a feature distance between pairs of strokes.

20. The computer program product of claim 18, wherein the stopping criterion includes at least one of a threshold inter-cluster distance or a threshold number of clusters.

* * * * *